(12) United States Patent
Wagner et al.

(10) Patent No.: US 7,193,714 B2
(45) Date of Patent: Mar. 20, 2007

(54) LENS BLANK ALIGNMENT AND BLOCKING DEVICE AND METHOD

(76) Inventors: Mark Donald Wagner, 1006 Smith Rd., Afton, VA (US) 22920; Daniel Edward Andrews, 1661 Redington Ln., Charlottesville, VA (US) 22901; David William Gerding, 154 Cottwood Dr., Barboursville, VA (US) 22923-2738; Henrik Arthur Schutz, 1685 Union Mills Rd., Troy, VA (US) 22974; Jennifer Snyder Shanks, 525 Kelly Ave., Charlottesville, VA (US) 22902; David Matthew Smith, 24 Pheasant Run, Waynesboro, VA (US) 22980; Curtis Kenneth Deckert, 18061 Darmel Pl., Santa Ana, CA (US) 92705

( * ) Notice: Subject to any disclaimer, the term of this patent is extended or adjusted under 35 U.S.C. 154(b) by 81 days.

(21) Appl. No.: 11/067,783

(22) Filed: Mar. 1, 2005

(65) Prior Publication Data
US 2005/0140938 A1    Jun. 30, 2005

Related U.S. Application Data

(62) Division of application No. 10/238,898, filed on Sep. 11, 2002, now Pat. No. 6,869,333.

(51) Int. Cl.
*G01B 11/00* (2006.01)
*B24B 49/00* (2006.01)
*B24B 51/00* (2006.01)
*B24B 19/00* (2006.01)

(52) U.S. Cl. .................................. 356/399

(58) Field of Classification Search .................. None
See application file for complete search history.

(56) References Cited

U.S. PATENT DOCUMENTS

| 3,451,177 A | * | 6/1969 | Buckminster et al. ...... 451/460 |
| 4,206,549 A | | 6/1980 | Gould |
| 4,372,368 A | | 2/1983 | Lombard |
| 4,597,636 A | * | 7/1986 | Hoshikawa ................. 349/158 |
| 4,977,675 A | | 12/1990 | Jewett, Sr. |

(Continued)

*Primary Examiner*—Gregory J. Toatley, Jr.
*Assistant Examiner*—Gordon J. Stock, Jr.
(74) *Attorney, Agent, or Firm*—Berenato, White & Stavish, LLC

(57) ABSTRACT

A lens blocking device is disclosed that includes a frame, a light source mounted on the frame, a carriage having a first end and a second end mounted on the frame for sliding movement between first and second positions, a first mirror mounted on the carriage first end and a lens block holder mounted on the carriage second end and shiftable between third and fourth positions with respect to the carriage, a stage disposed between the light source and the carriage, and including an opening, for supporting an object, an at least partially translucent screen generating a display image operably connected to the support frame, at least one second mirror arranged to reflect an image of an object on the stage from the first mirror, when the carriage is in the first position, onto the screen, and an actuator operably connected to the carriage. The actuator shifts the carriage between the first position and the second position and shifts the block holder between the third position and the fourth position, and the display image on the screen is superimposed over an image of the object on the stage when the carriage is in the second position.

27 Claims, 14 Drawing Sheets

U.S. PATENT DOCUMENTS

| | | |
|---|---|---|
| 5,283,980 A | 2/1994 | Lohrenz |
| 5,486,882 A * | 1/1996 | Yamaguchi et al. ........... 353/77 |
| 5,498,200 A * | 3/1996 | Werner ....................... 451/460 |
| 5,505,654 A | 4/1996 | Wood |
| 5,720,647 A | 2/1998 | Gottschald |
| 5,721,644 A | 2/1998 | Murray |
| 5,919,080 A | 7/1999 | Savoie |
| 5,960,550 A | 10/1999 | Weir |
| 6,011,630 A | 1/2000 | Shanbaum |
| 6,012,965 A | 1/2000 | Savoie |
| 6,045,432 A | 4/2000 | Shibata |
| 6,056,633 A | 5/2000 | Sesena |
| 6,095,896 A | 8/2000 | Kobayashi |
| 6,099,383 A | 8/2000 | Mizuno |
| 6,220,929 B1 | 4/2001 | Mizuno |
| 6,234,869 B1 | 5/2001 | Kobayashi |
| 6,250,989 B1 | 6/2001 | Mizuno |
| 6,283,826 B1 | 9/2001 | Mizuno |
| 6,328,629 B1 | 12/2001 | Togawa |
| 6,328,635 B1 | 12/2001 | Suzuki |

* cited by examiner

LENS BLANK ALIGNMENT AND BLOCKING DEVICE AND METHOD

CROSS REFERENCE TO RELATED APPLICATIONS AND CLAIM TO PRIORITY

The present application is a division of application Ser. No. 10/238,898, filed Sep. 11, 2002, now U.S. Pat. No. 6,869,333 which is related to an application entitled "A System and Method for Aligning Reference Marks on A Lens Blank Using Adjustable Alignment Marks", Ser. No. 10/238,894, filed Sep. 11, 2002, entitled A System and Method for Aligning Reference Marks on a Lens Blank, the disclosures of which are hereby incorporated by reference, and to which priority is claimed under 35 U.S.C. §120.

FIELD OF THE INVENTION

The present invention is directed toward a device and method facilitating the alignment of a lens blank with a lens block, and, more specifically, toward a device and method facilitating the alignment of a lens blank with a lens block through use of a display screen that displays alignment markings and a projector that projects an image of a lens blank against the display screen so that, by aligning the image of the lens blank with the alignment markings on the display, the lens blank can be properly positioned for blocking and thereafter blocked.

BACKGROUND OF THE INVENTION

An ophthalmic lens blank requires certain processing before it can be fitted into a frame. Specifically, after a lens blank has been formed with the optical properties desired, it must be edged to a size and shape appropriate for a given frame to ensure a good fit with the frame. However, the optical properties of lens blanks are not uniform over their surfaces. The variation in optical properties depends in part on the type of lens blank, e.g. single vision, multi-focal, so-called progressive designs, and a variety of other factors. It is therefore important that a lens blank be properly positioned before it is edged to its final shape to ensure that necessary areas of the finished lens will be aligned with a user's eye when the lens is mounted in a frame. Even small errors in alignment can significantly degrade the quality of a lens and degrade the quality of a patient's corrected vision.

Before a lens can be edged, it is generally attached to a mount or a "block" in a process often referred to as "blocking." Once the lens has been blocked, the block carrying the lens is placed in a chuck in an edging machine so as to hold the lens in a predetermined orientation with respect to the edging machine. Various devices are known in the prior art for blocking lenses. Most such devices require a user to have a certain degree of skill in order to properly align reference markings on the lens blank with alignment markings on a lens blocker and to hold the blank in position while a lens block is attached to the blank. Prior art lens blocking devices are shown, for example, in U.S. Pat. No. 5,505,654 to Wood, U.S. Pat. No. 5,721,644 to Murray, U.S. Pat. No. 5,720,647 to Gottschald and U.S. Pat. No. 6,056,633 to Sesena, the disclosures of which are hereby incorporated by reference.

In one of these prior art devices, shown in U.S. Pat. No. 5,505,654 to Wood, a lens blank 14 is supported over a display screen 5, which may be an LCD, on which various data concerning the lens are displayed. A diffusing surface 37, comprising frosted Mylar film, is mounted over the display screen. A light source 34 shining down on the lens from above forms a shadow of the lens blank on the diffusing surface, and this shadow, superimposed on the data from display screen 5, is reflected off a series of mirrors and projected through a front viewing port 30. However, the quality of the LCD image may be diminished after being reflected several times, and the arrangement of mirrors presents a user with a virtual image of the lens blank—an image that appears to be as far away from the user's eyes as the entire optical path length from the diffusing surface to the user's eyes. Moreover, the mirrors invert the image of the lens. This means that when a user moves the lens blank to the left in order to align it with reference markings, the reflected image of the lens blank will move to the right. Movement of the lens blank toward and away from the user will also be reversed. While operators with experience can learn to work with such a system, it can be difficult for novices or infrequent users to use.

Lens blockers are often operated by staff who are not trained in the inner workings of the device. Thus, if the blocker malfunctions, it is generally necessary to contact a technician. Even changing the lamp in a typical lens blocker may be beyond the skill of the average operator. Thus, for example, if the lamp in the blocker burns out, the blocker will not be usable until a technician arrives to correct the problem. If this occurs when a technician is not readily available, the blocker may be out of service for hours.

It is therefore desirable to provide a lens alignment system for a lens blocker that 1) presents a non-inverted image of a lens blank to a user, 2) that includes a directly viewable display screen rather than screen that is only viewable in reflection 3) that presents a viewer with a real image of a lens blank and lens support rather than a virtual image and 4) that includes a mechanism for replacing a burned out lamp that is easy to operate and that does not require access to the interior of the blocker.

SUMMARY OF THE INVENTION

These difficulties and others are addressed by the present invention, which, in a first aspect, comprises an alignment device having a light source, a first mirror and a stage, disposed between the light source and the first mirror, for supporting an object such that an image of an object supported on the stage is reflected by the first mirror. A screen is also provided on which a processor generates images. A second mirror is arranged to receive the image reflected from the first mirror and project the image of an object on the stage onto the screen. In this manner, the generated image on the screen is combined with the image of the object on the stage that is projected onto the screen.

In another aspect, the invention comprises a lens blocking device having a frame, a light source mounted on the frame, and a carriage having a first end and a second end mounted on the frame for sliding movement between first and second positions. A first mirror is mounted on the carriage first end and a lens block holder is mounted on the carriage second end. The block holder is shiftable between third and fourth positions with respect to the carriage. A stage for supporting an object is located between the light source and the carriage, which stage includes an opening. An at least partially translucent screen generating a display image is operably connected to the support frame. At least one second mirror is arranged to reflect an image of an object on the stage from the first mirror, when the carriage is in the first position, onto the screen. An actuator is operably connected to the carriage, the actuator shifting the carriage between the first position and the second position, and shifting the block holder between the third position and the fourth position, so that the display image on the screen is superimposed over the image of the object on the stage when the carriage is in the first position.

Another aspect of the invention comprises an image alignment device including a liquid crystal display having a first region and a second region and a first side and a second side. A backlight is mounted over the first region of the second side. A processor is operably connected to the liquid crystal display for generating an image on the liquid crystal display, while a projector projects an image against the second region of the second side so that the generated image on the liquid crystal display second portion is superimposed over the projected image when the display screen is viewed from the first side.

A further aspect of the invention comprises a lens alignment device with a stage for supporting a lens blank and an at least partially translucent screen having a first side and a second side. An image generator generates an image on the screen and a projector projects an image of an object on the stage against the second side of the screen, so that, when the screen is viewed from the first side, the generated image is superimposed over the projected image.

The invention also comprises a method of blocking a lens blank that involves providing an at least partially translucent screen having a first side and a second side and placing a lens blank on a stage near the screen. Alignment markings are generated on the screen while a non-inverted image of a lens blank supported on the stage is projected against the second side of the screen. The lens blank having alignment markings is moved with respect to the stage until the image of the lens and its alignment markings projected on the screen is aligned with the generated alignment markings on the screen. A lens block bearing an adhesive is provided at a predetermined location adjacent the stage and moved from the predetermined location into contact with the lens blank to adhere the lens block to the lens blank.

Another aspect of the invention is a lens blocking device having a frame, a light source mounted within the frame, and a carriage having a first end and a second end mounted for sliding movement between first and second positions with respect to the frame. A first mirror is mounted on the carriage first end and a lens block holder is mounted on the carriage second end so that it is shiftable between third and fourth positions with respect to the carriage. A transparent stage having an opening is mounted between the light source and the carriage, and an LCD having a first region and a second region and a first side and a second side is mounted on the frame. A backlight overlies the LCD first region on the second side and a processor generates alignment markings on the LCD second region and alphanumeric characters on the screen first region. At least one second mirror is mounted on the frame and arranged to reflect an image of an object on the stage reflected from the first mirror, when the carriage is in the second position, onto the second side of the second portion of the LCD. Optics are also provided between the first mirror and the at least one second mirror for inverting an image reflected from the first mirror. An actuator is operably connected to the carriage for selectively shifting the carriage between the first and second positions and the lens block holder between the third and fourth positions. In this manner, the generated alignment markings on the screen second region overlie the image of the lens blank reflected on the second side of the screen when the carriage is in the first position.

Another aspect of the invention comprises a method of positioning a lens blank for blocking that involves providing a screen having a first side and a second side adjacent to a stage and placing a lens blank on the stage. The lens blank has a first surface facing the stage with reference markings on the first surface. Alignment markings are generated on the screen so that they are viewable from the first side of the screen, and a non-inverted image of the reference markings on the first side of the lens blank are projected onto the second side of the screen. The lens blank is moved with respect to the stage while directly viewing the real image of the lens blank and the generated alignment markings until the image of the reference markings on the lens blank projected on the screen are aligned with the generated alignment markings on the screen.

Another aspect of the invention comprises a method of positioning a lens blank for blocking that involves providing a screen having a first side and a second side and a stage. A lens blank is placed on the stage, and alignment markings are generated on the screen so that they are viewable from the first side of the screen. An enlarged image of the lens blank is projected onto the second side of the screen, and the lens blank is moved with respect to the stage while viewing the enlarged image of the lens blank and the generated alignment markings until selected portions of the enlarged image of the lens blank projected on the screen are aligned with the generated alignment markings on the screen.

BRIEF DESCRIPTION OF THE DRAWINGS

The present invention will be better understood after a reading of the following detailed description of the invention in connection with the following drawings.

DETAILED DESCRIPTION OF THE INVENTION

Figure 1:
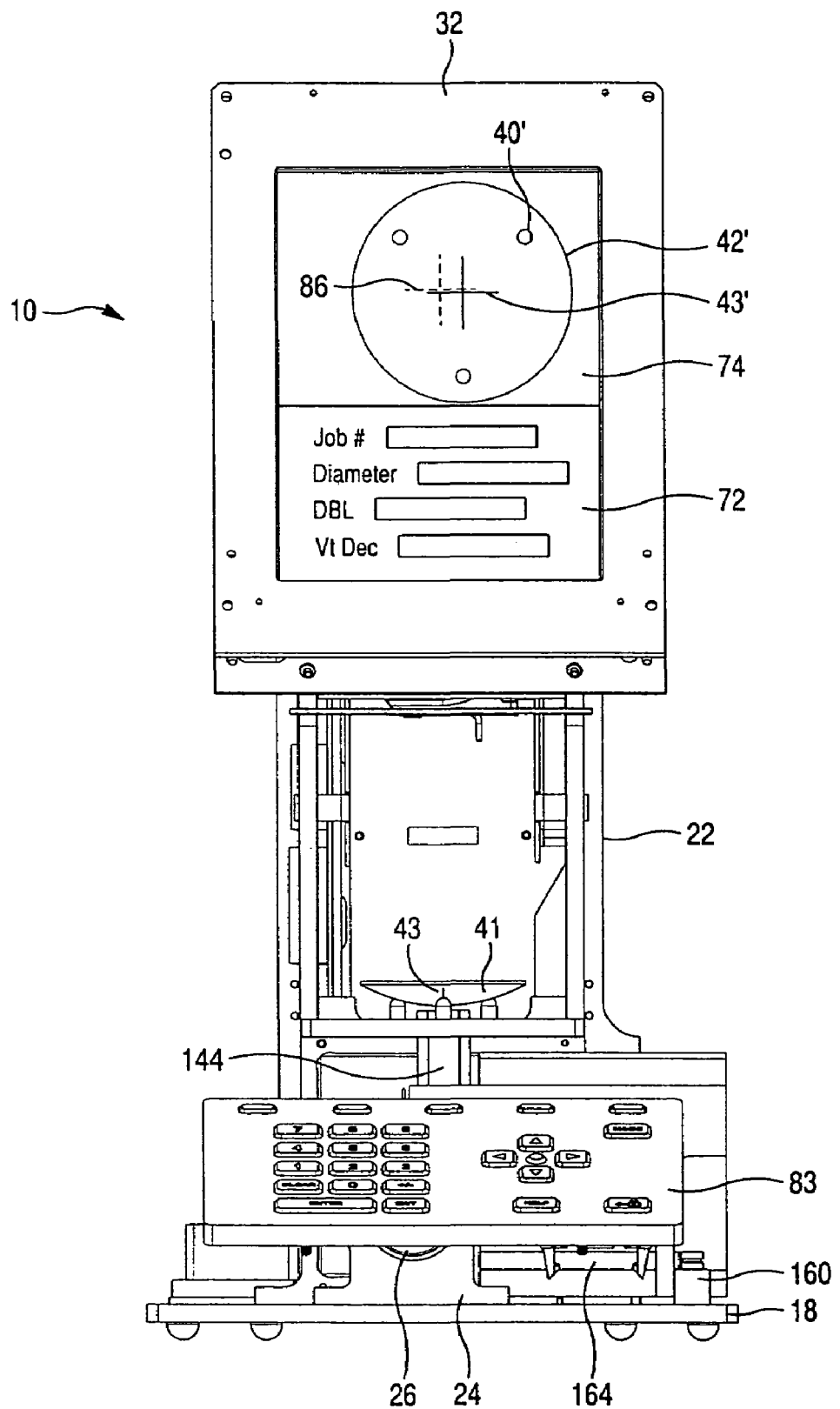
FIG. 1 is a front elevational view of an alignment device according to the present invention.

Referring now to the drawings, wherein the showings are for purposes of illustrating a preferred embodiment of the invention only, and not for purposes of limiting same, FIGS. 1, 2, 5 and 6 show a lens blank alignment and blocking device 10 according to the present invention that includes a frame 12 having a front portion 14 and a rear portion 16. The frame 12 further comprises a base 18, a rear wall 20 extending from rear portion 16, and a screen support 22 extending from base 18 approximately midway between frame front portion 14 and frame rear portion 16 in the same direction as rear wall 20, which direction will be referred to as "up" with reference to these figures. To frame 12 are mounted, proceeding generally from the front portion 14 of frame 12 toward rear portion 16, a motor support 24 supporting a motor 26, a carriage assembly 28, and a generally C-shaped optics housing 30 that extends from screen support 22 along base 18 to rear wall 20, upwardly along rear wall 20 and back toward the front portion 14 of frame 12 ending at a screen 32 mounted on screen support 22. The optics housing 30 includes a lamp housing door 34 in a sidewall thereof. A stage 36 is supported adjacent to frame 22 by an outer housing of lens blank alignment and blocking device 10 (not shown). Stage 36 is transparent and, as shown in FIG. 3, includes a central opening 38 surrounded by three pegs 40 for supporting a workpiece, such as lens blank 42 shown in FIG. 2, over central opening 38.

Figure 4:
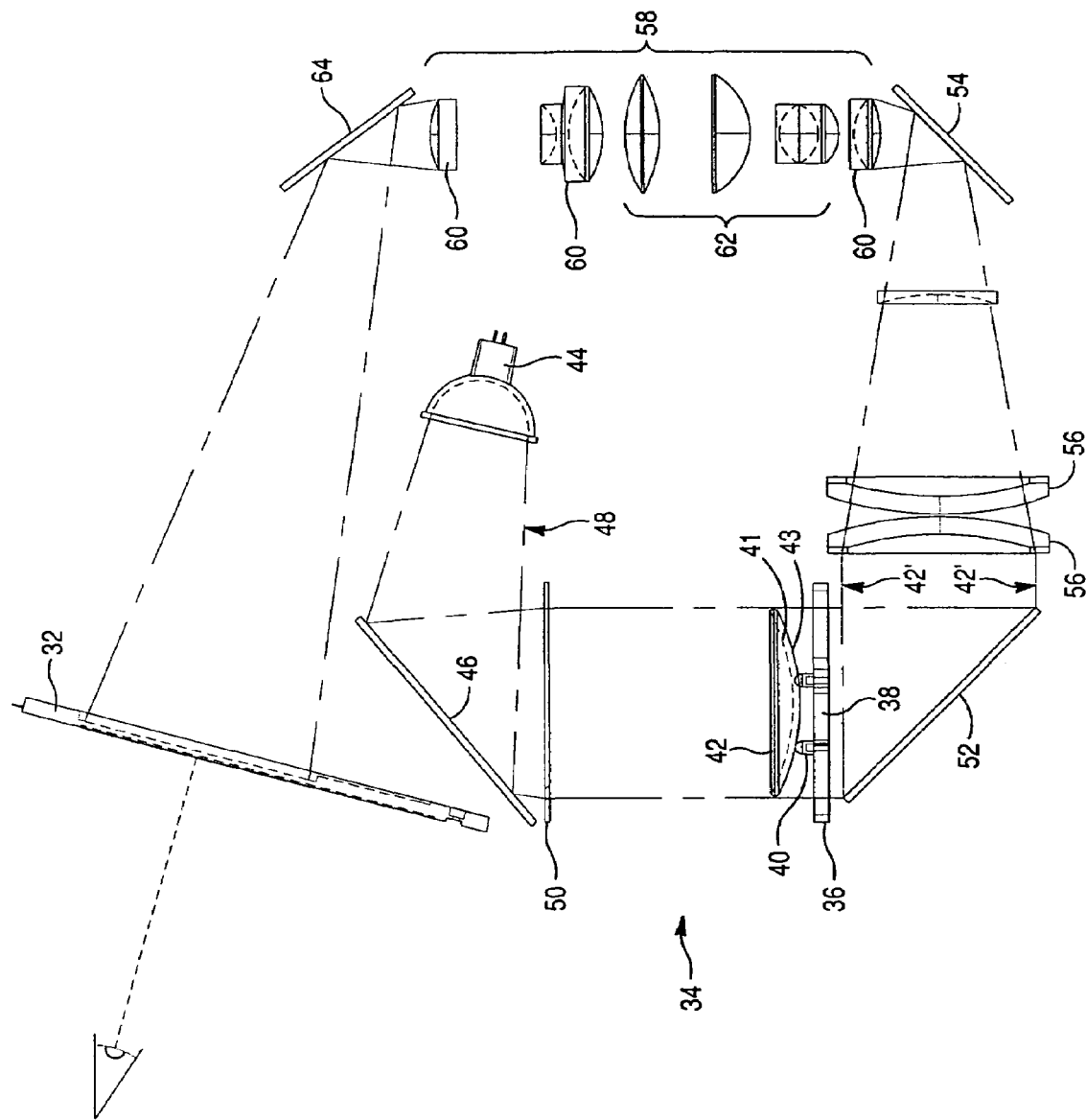
FIG. 4 is a schematic view of the optical system of the alignment device of FIG. 1.

Lens blank alignment and blocking device 10 projects an image of a workpiece supported on pegs 40 onto screen 32 using a projection system 34, as best shown in FIG. 4, that includes cooperating lenses and mirrors, many of which are positioned inside optics housing 30. The relative positions of the mirrors and lens are shown schematically in FIG. 4. The projection system 34 includes a lamp 44, preferably a halogen lamp having a faceted reflector, such as typically used in movie projection and the like, directed at a first mirror 46 mounted above stage 36 and angled with respect to lamp 44 and stage 36, such that light rays 48 from lamp 44 are directed downwardly on stage 36 and any workpiece supported thereon. A Fresnel lens 50 is mounted between first mirror 46 and stage 36 to collimate the light shining onto the stage 36. A second mirror 52 is mounted beneath stage 36, and, because stage 36 is transparent, an image 42' of lens blank 42 is projected onto the second mirror 52. Second mirror 52 is angled to direct image 42' toward the rear portion 16 of the lens alignment and blocking device 10 and toward a third mirror 54, the image 42' passing through several condenser lenses 56 between the second mirror 52 and the third mirror 54 and upwardly along rear wall 20 through an image conditioning assembly 58 that includes various lens. These lenses include first, second and third achromats 60 for correcting chromatic aberrations that could degrade the image 42'. The remaining lenses 62 further condition image 42' by magnifying the image 42' approximately 1.3 times and inverting the image for reasons explained hereafter. After leaving the image conditioning assembly 58, the image 42' is reflected off a fourth mirror 64 angled to project the image 42' onto screen 32.

Lens 42 includes reference markings 43, best shown in FIG. 1. The reference markings are on the front or convex side 41 of lens 42, the side that faces stage 36 and second mirror 52 on carriage assembly 28. Therefore, it is an image of this front side 41 that is projected toward screen 32 by the projection system 34. Certain prior art alignment devices required reference markings to be viewed through a lens, and therefore, fact that the images of the reference markings had been refracted had to be taken into account when aligning the reference markings on the lens with fixed reference markings. This problem is avoided in the present invention by viewing the reference markings from the side of the lens blank on which they exist rather than through the lens blank.

Figure 9:
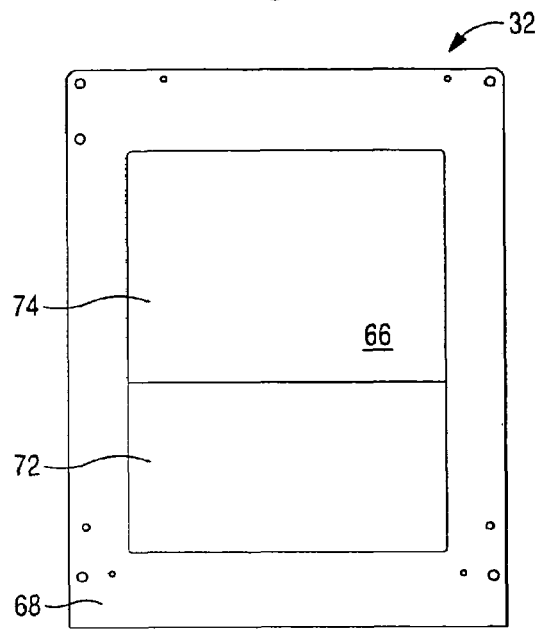
FIG. 9 is a rear elevational view of the display screen of the alignment device.
Figure 10:
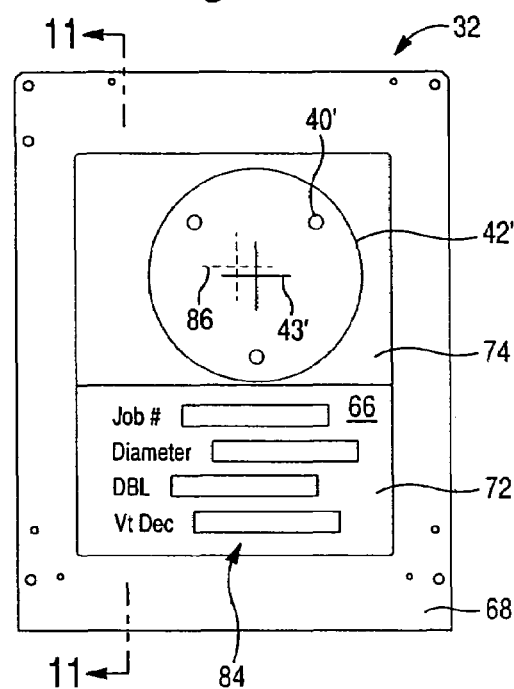
FIG. 10 is a front elevational view of the display screen of FIG. 9.
Figure 11:
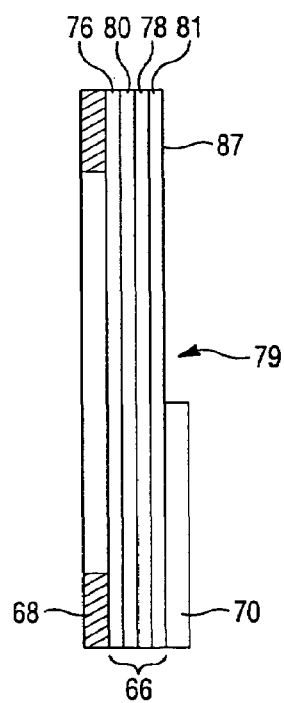
FIG. 11 is a sectional view taken along line 11—11 in FIG. 10.
Figure 12:
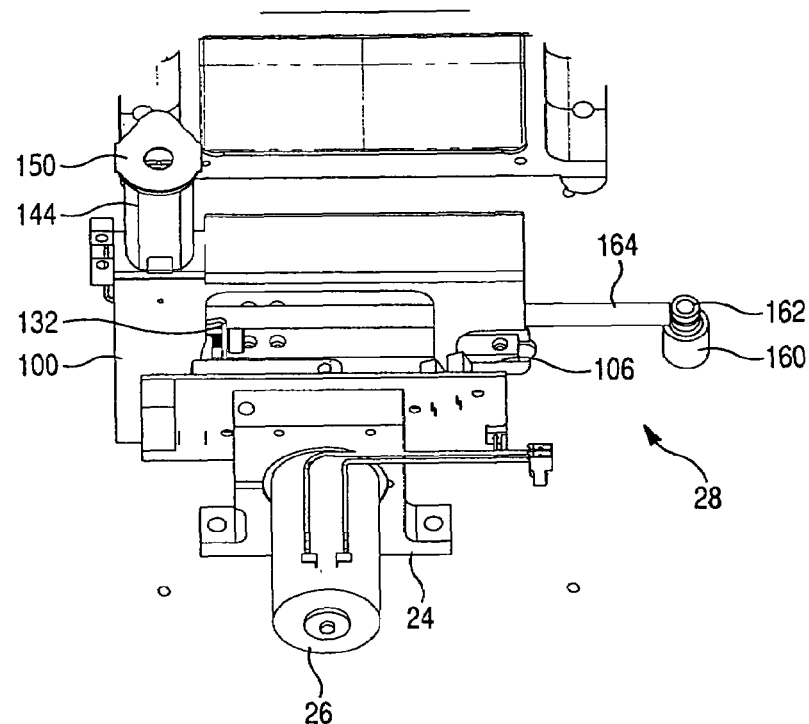
FIG. 12 is a front perspective view of the carriage assembly with the carriage in the viewing position
Figure 14:
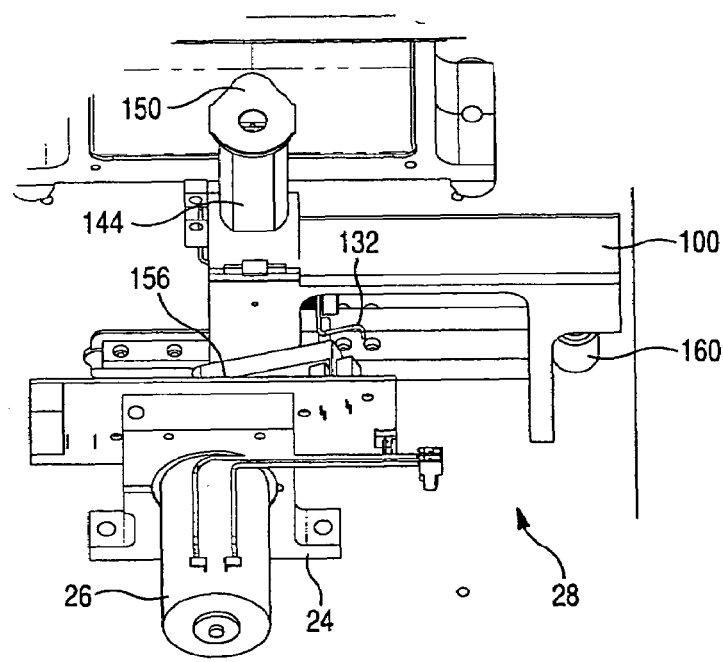
FIG. 14 is a front perspective of the carriage assembly with the carriage in the blocking position and the blocking chuck raised.

With reference to FIGS. 9–11, screen 32 comprises a liquid crystal display (LCD) 66 mounted to front frame 68 connected to screen support 22. A backlight 70 covers a first region 72 of the LCD 66 and the amount of illumination provided by the backlight is controllable via keyboard 83 and processor 82. Second portion 74 of the LCD 66 does not include a backlight and is partially translucent. The LCD 66 comprises a polarizing layer 76 and a layer 78 of liquid crystal material sandwiched between front and rear planar supports 80, 81. Rear surface 79 of planar support 81 includes a translucent film 87 on which projected image 42' appears when the image is projected on screen 32. The liquid crystal material lies essentially in a first plane, and the rear surface of screen 32 is formed by the translucent film 87. The distance separating the translucent film 87 and the liquid crystal layer 78 is less than 1 mm and, preferably, less than about 0.5 mm, to minimize parallax between images produced in the liquid crystal layer 78 and images projected on the translucent film 87 on planar support 81. The ideal separation would be 0 mm or as close thereto as possible given the physical dimensions of the LCD.

Figure 5:
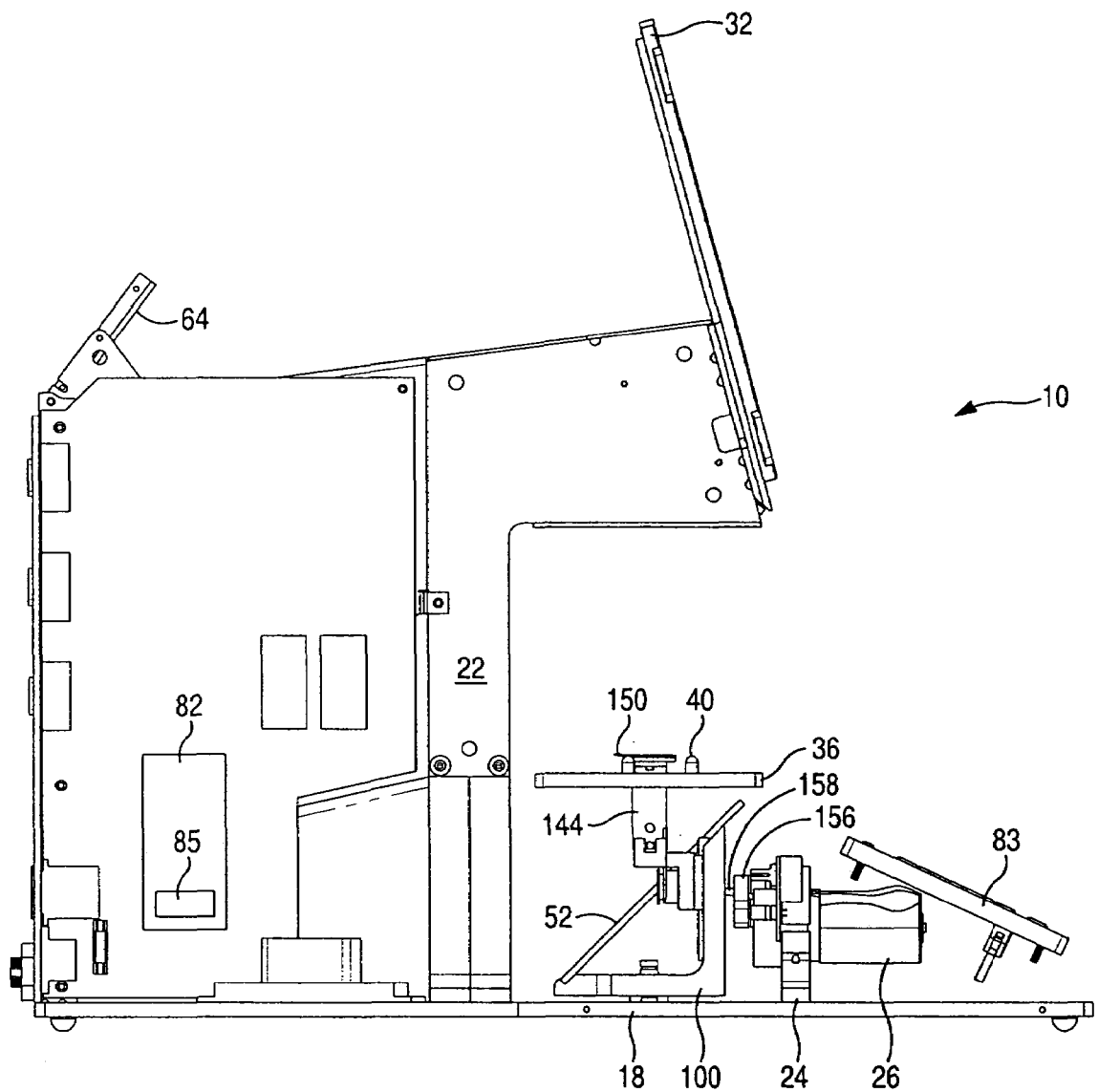
FIG. 5 is a left side elevational view of the alignment device of FIG. 1.
Figure 6:
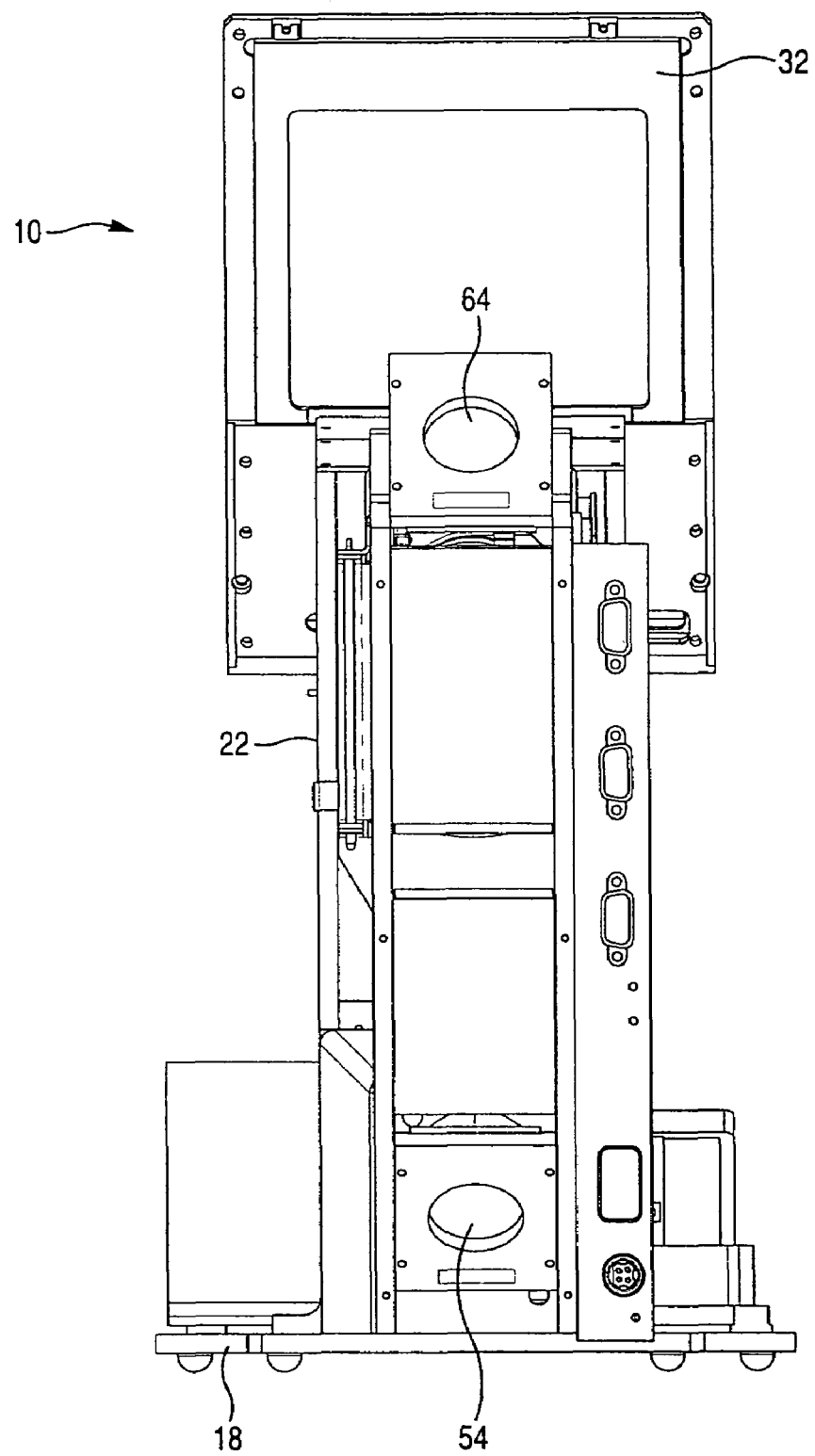
FIG. 6 is a rear elevational view of the alignment device of FIG. 1 with a rear portion of the device frame removed to show the interior of the device.

The LCD 66 is connected to a processor 82 having a memory 85, as best shown in FIG. 5, in a well known manner and serves as a display for displaying images produced by processor 82 and characters input using keyboard 83 as best shown in FIG. 1. The first backlit region 72 displays alphanumeric data and graphics 84 within defined fields, while the second region 74 displays fiducial marks, such as crosshairs or other alignment images 86 as best shown in FIG. 10. The image 42' of the lens blank 42 is projected against the rear surface 79 of rear planar support 81, and, because the second region 74 of the LCD is translucent or at least partially translucent, the image 42' projected onto the translucent film 87 on rear surface 79 of the rear planar support 81 is visible from the front or frame side of the LCD 66. Images 40' of the pegs 40 are also visible. The projection system 34 enlarges the image 42' making it easier to accurately align image 42' with the alignment images 86. The alignment images 86 are seen combined with the projected image 42' on the screen 32. The lens blank 42 on pegs 40 can be moved as necessary to align projected images 43' of alignment markings 43 on lens 42 with alignment images 86 on the screen. Because the image conditioning assembly 58 inverts image 42', the image 42' that is projected against rear surface 79 of screen 32 moves in the same direction as the lens 42, i.e., when lens 42 is moved to the left, the image 42' also moves to the left, as viewed in FIG. 10, and when lens 42 is moved away from a user (toward the rear 16 of the lens alignment and blocking device 10), the image 42' on screen 32 will move upwardly, in a direction away from backlit first region 72 of LCD 66. This makes the lens alignment and blocking device 10 easier to use than prior art devices in which images of lens blanks often appeared to move in the opposite direction from the direction in which the lens blank was moved. Moreover, rear planar support 81 is only about one half of one millimeter thick. Thus, image 42' exists in the plane of the rear surface 79 of planar support 81 which is less than about 1 mm and preferably about 0.5 millimeters from the plane of the image generated by the liquid crystal material in liquid crystal layer 78. This close alignment of the planes of the alignment images 86 and the projected image 42' substantially eliminates the problem of parallax for a person viewing screen 32 from an angle. This, in turn, allows for more accurate alignment of a lens blank 42 with a lens block 148 and the production of higher quality lenses.

Figure 13:
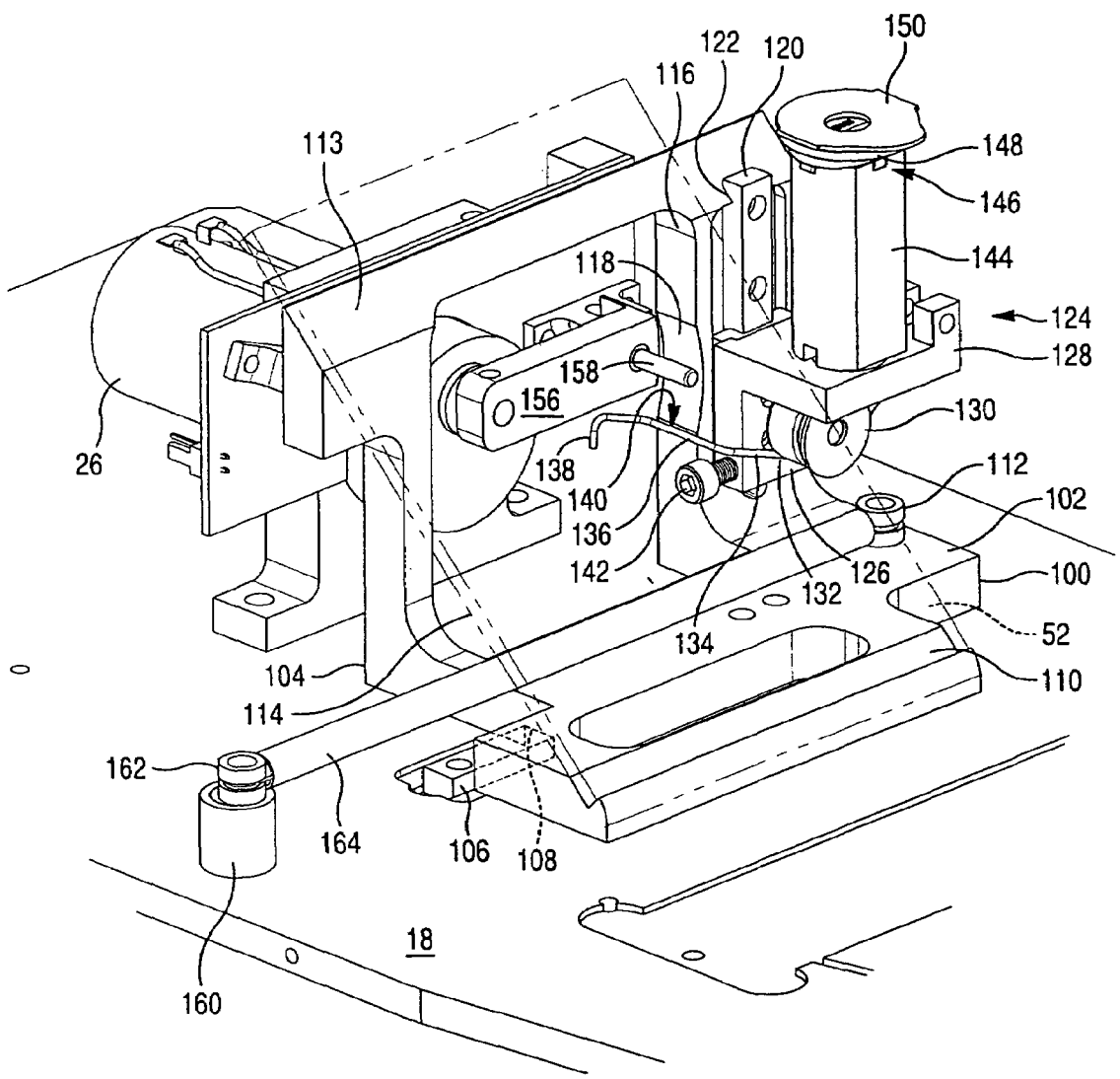
FIG. 13 is a rear perspective view of the carriage assembly of FIG. 12 with the mirror removed.
Figure 15:
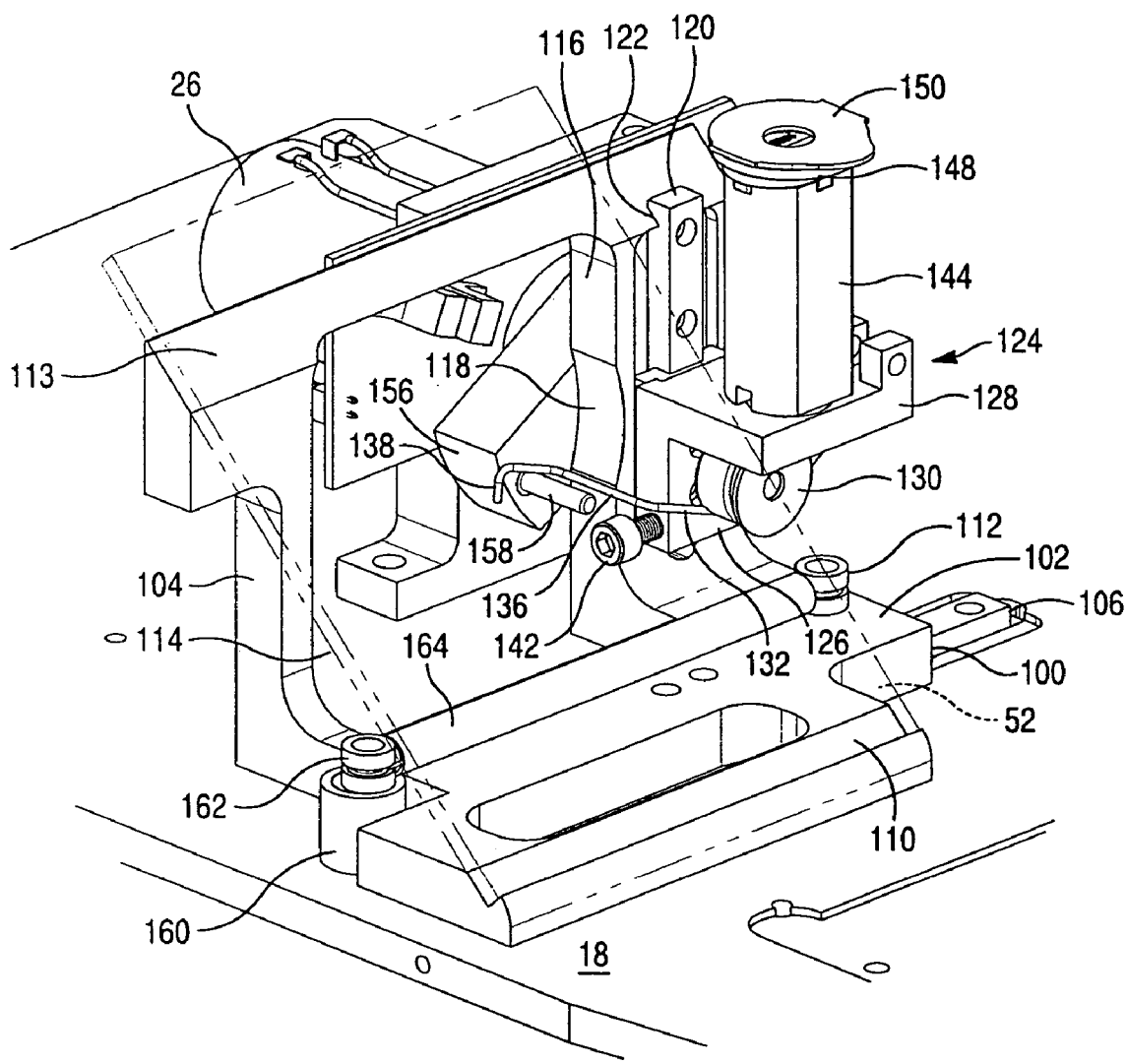
FIG. 15 is a rear perspective view of the carriage assembly of FIG. 14 with the blocking chuck raised.
Figure 16:
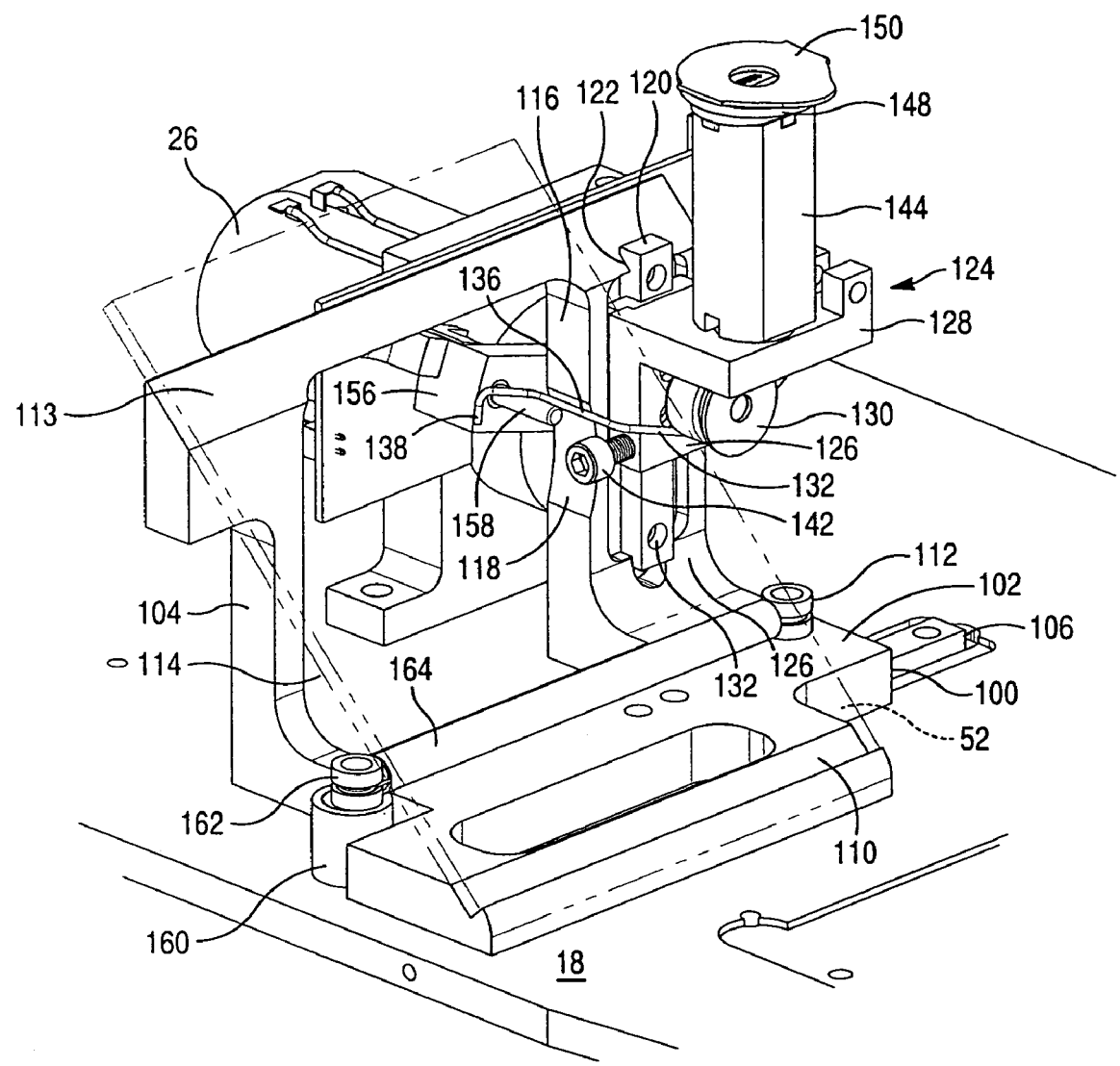
FIG. 16 is a rear perspective view of the carriage assembly of FIG. 14 with the blocking chuck in a lowered position.

FIGS. 12–16 show carriage assembly 28. With reference to FIGS. 13, 15 and 16, carriage assembly 28 comprises a carriage 100 having a horizontal platform 102 and a vertical frame 104 extending upwardly from the horizontal platform 102. A linear slide 106 is mounted on base 18 rearwardly from motor support 24, and a groove 108 in the underside of horizontal platform 102 receives linear slide 106. Linear slide 106 and groove 108 are configured such that carriage 100 slides freely in a single linear direction between first and second positions with respect to base 18. Horizontal platform 102 further includes a mirror support notch 110 for supporting and retaining the lower edge of second mirror 52, and a pin 112 to which a spring is attached as described herein.

Vertical frame 104 includes an opening 114 having a sidewall 116 which includes an arcuate recess 118 in a central portion thereof. Vertical frame 104 also includes an angled top wall 113 against which second mirror 52 rests. A second linear slide 120 is mounted on vertical frame 104 in a groove 122 next to opening 114. An L-shaped platform 124 is mounted on the second linear slide 120 for sliding movement in a direction normal to horizontal platform 102. L-shaped platform 124 comprises a first leg 126 generally parallel to vertical frame 104 and a second leg 128 normal to first leg 126 and extending away from vertical frame 104 in the direction of rear 16 of base 18. A spring mount 130 is attached to the first leg 126 of L-shaped platform 124, and a torsion spring 132 is attached to the spring mount. Torsion spring 132 has a Z-shaped end portion, comprising, in the direction from spring mount 130 to the free end of torsion spring 132, a first portion 134 parallel to first leg 126, a second portion 136 normal to first portion 134 and extending though opening 114 spaced apart from sidewall 116 by a gap 140, and a third portion 138 substantially parallel to first portion 134. A stop 142 extends from the first leg 126 of the L-shaped platform 124 and engages second portion 136 of torsion spring 132 to hold torsion spring 132 under a preload.

A chuck 144 is mounted on second leg 128 of L-shaped platform 124 which has a standard lower portion with which it mates to a projection (not shown) on the second leg 128, and an upper portion 146 adapted to mate to one or more standard industry lens blocks, such as block 148 shown in FIG. 13. Different chucks are used for different blocks. An adhesive pad 150 is mounted on block 148 in a well known manner so that, when the chuck 144 and block 148 are pressed against lens blank 42, the adhesive pad 150 will stick to the lens blank 42. The L-shaped platform 124 thus can slide linearly with respect to vertical frame 104 between a first lowered position 152, shown in FIGS. 12 and 13, and a second raised position 154, shown in FIGS. 14 and 16.

A crank arm 156 is attached to motor 26, as best shown in FIGS. 13, 15 and 16 and extends in a direction generally parallel to vertical frame 104 and is rotated in first and second directions, clockwise and counterclockwise, respectively, as viewed in FIGS. 13, 15 and 16 by motor 26. A crank pin 158 extends from crank arm 156 and into opening 114 where it engages sidewall 116.

An eccentric stop 160, as best seen in FIGS. 13 and 15, is mounted on platform 18 and includes a pin 162 supporting spring 164 extending between pin 162 and pin 112 on horizontal platform 102. Spring 164 biases carriage 100 toward eccentric stop 160 and holds it against the eccentric stop 160 until crank arm 156 and motor 26 overcome the force of the spring and move the carriage 100 away from the eccentric stop 160. Eccentric stop 160 is mounted eccentrically on base 18, so that it can be rotated to adjust its distance from carriage 100 and hence the stopping position of carriage 100.

Figure 2:
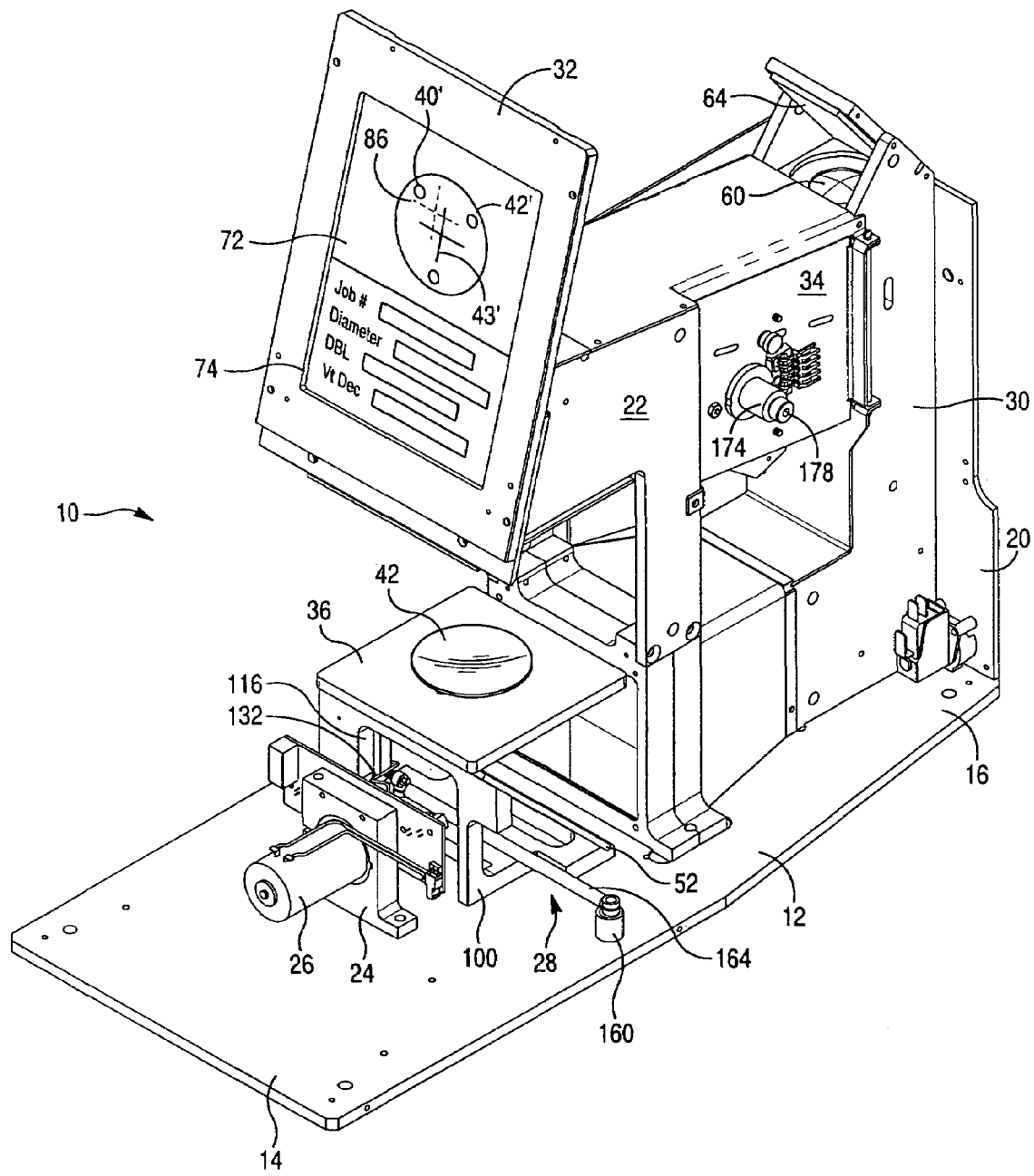
FIG. 2 is a perspective view of the alignment device of the FIG. 1 with the keyboard removed and the carriage positioned in the alignment position.
Figure 3:
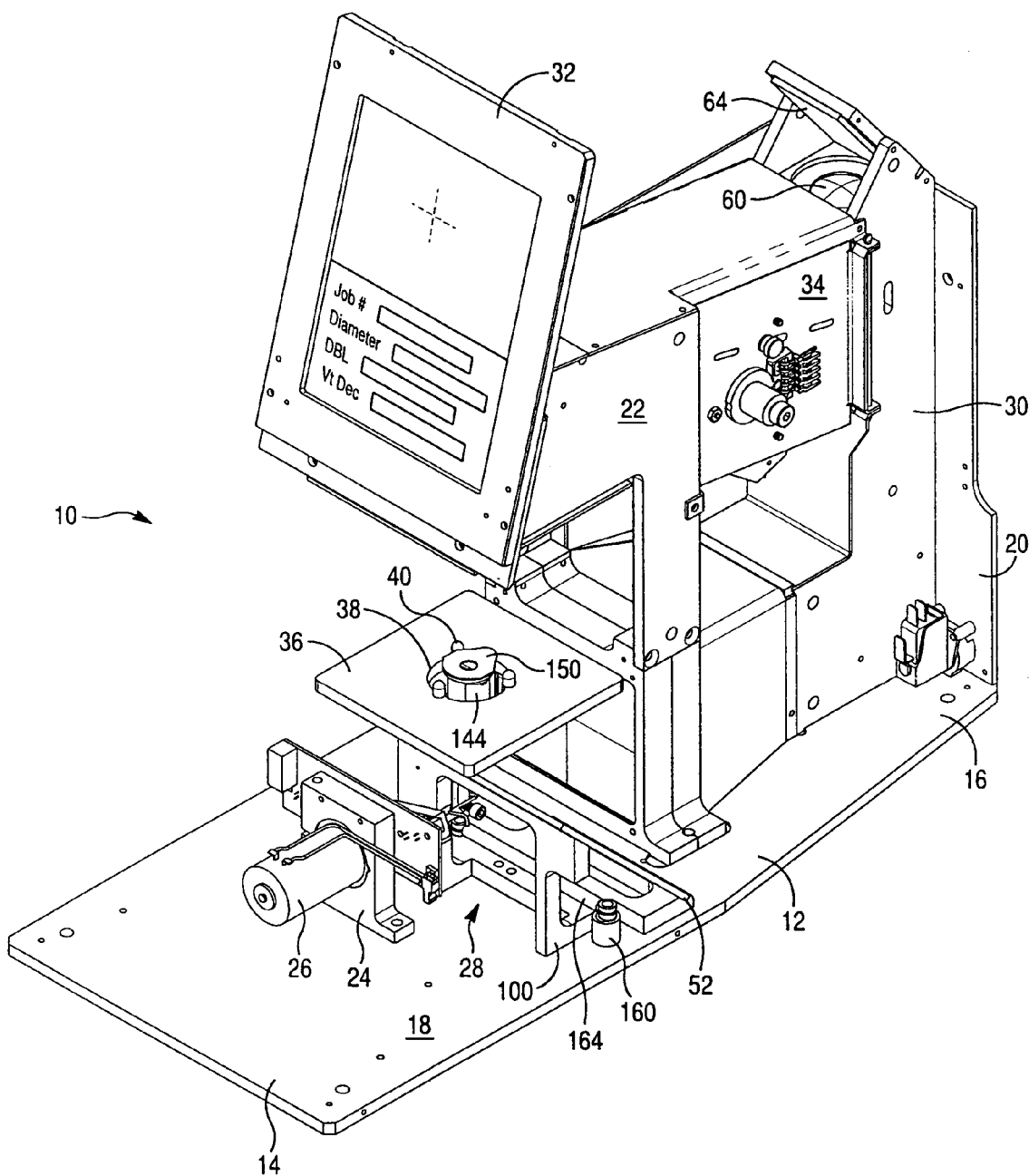
FIG. 3 is a perspective view of the alignment device of FIG. 1 with the keyboard removed and the carriage positioned in the blocking position with the block holder raised.

Lens alignment and blocking device 10 is shown with carriage 100 in the alignment position in FIGS. 2 and 13 and in the blocking position in FIGS. 3 and 16. The shifting of the carriage 100 between the blocking position and alignment position will be described with reference primarily to FIGS. 13, 15 and 16.

In the alignment position of FIGS. 2 and 13, crank pin 158 engages arcuate recess 118 in sidewall 116 of opening 114 in the vertical frame 104 and holds carriage 100 in the alignment position. In this position, spring 164 is stretched, held under tension and prevented from pulling carriage 100 toward eccentric stop 160. Second mirror 52 is supported in mirror support notch 110 and by the angled top wall 113 of carriage 100. Second mirror 52 is shown in FIG. 2 and, for clarity, shown in phantom in FIG. 13. In this alignment position, second mirror 52 is positioned beneath central opening 38 in stage 36.

To shift carriage 100 into the blocking position of FIGS. 3 and 16, motor 26 is actuated, under the control of processor 82, to turn crank arm 156 clockwise as viewed in FIGS. 13 and 15 and move crank pin 158 toward base 18 and through gap 140 between sidewall 116 and second portion 136 of torsion spring 132. As crank arm 156 rotates, crank pin 158 moves in the direction of eccentric stop 160, and thus allows spring 164 to contract and pull carriage 100 along linear slide 106 toward eccentric stop 160. Crank arm 156 continues to rotate until carriage 100 contacts eccentric stop 160. At this point, crank pin 158 is still in contact with sidewall 116, as shown in FIG. 15, and block 148 is positioned beneath central opening 38 of stage 36 beneath a lens blank 42. As the crank arm 156 continues to rotate in a clockwise direction, it moves away from sidewall 116 and engages third portion 138 of torsion spring 132. Continued rotation of the crank arm 156 exerts upward pressure on third portion 136 of torsion spring 132 and moves L-shaped platform 124 upwardly, as shown in FIG. 16, so that block 148 passes through central opening 38 in the stage 36 and against lens blank 42. Lens blank 42 is thus secured by adhesive pad 150 to block 148, and thus may be placed onto a suitable edger. These steps are reversed to lower chuck 144 and move the carriage 100 back to the alignment position.

Figure 7:
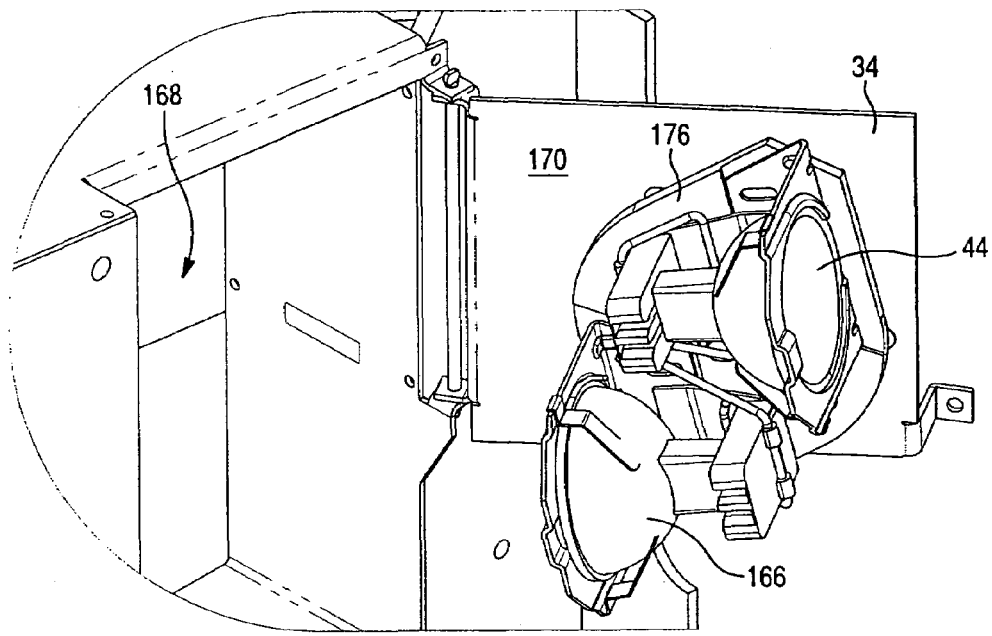
FIG. 7 is a detail perspective view of the interior of the lamp assembly housing and lamp assembly door shown in circle VII of FIG. 2.
Figure 8:
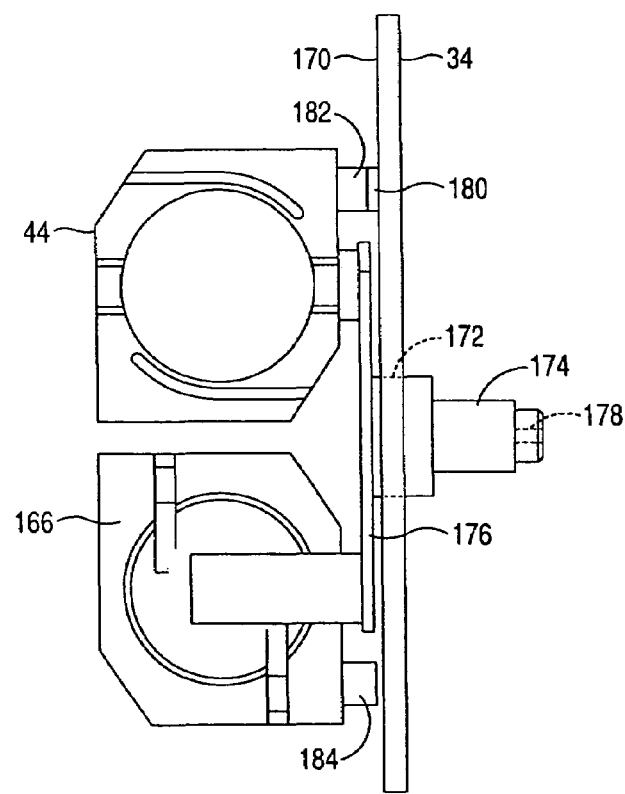
FIG. 8 is a side elevational view of the lamp assembly and lamp assembly door of FIG. 7.

Referring now to FIGS. 7 and 8, the steps required for replacing lamp 44 with a secondary lamp 166 will be described. As noted above, persons operating lens blocking devices may not be trained to service the blocking devices, and replacing a burned out lamp may require that the lens blocking device be opened and/or partially disassembled. Thus, if a technician is not available when a lens needs to be replaced, the machine may experience significant out-of-service time. The lens alignment and blocking device 10 allows an unskilled operator to quickly switch a burned out lamp 44 with a secondary lamp 166, so that the use of the lens alignment and blocking device 10 can continue substantially uninterrupted. A technician can then replace the burned out bulb when convenient.

As best shown in FIGS. 7 and 8, door 34 is opened to reveal lamp housing 168 and the inner side 170 of door 34. When door 34 is closed, lamp 44 is directed toward first mirror 46 as shown schematically in FIG. 4. Door 34 includes an opening 172 through which a shaft 174 extends, shaft 174 being connected to a support frame 176. Shaft 174 is rotatably mounted in opening 172 so that support frame 176 can be rotated by turning shaft 174 when door 34 is closed. Shaft 174 also includes a socket 178 for receiving a screwdriver or hexagonal wrench (not shown) with which shaft 174 can be more easily rotated. Lamp 44 and secondary lamp 166 are mounted on support frame 176 for rotation therewith. Inner side 170 of door 34 includes an electrical contact plate 180, as best shown in FIG. 8, connected to a power source. Lamps 44 and 160 also include electrical contact plates 182 and 184, respectively. By rotating shaft 174, one or the other of lamp electrical contact plates 182, 184 can be brought into electrical contact with inner door contact plate 180 to provide power to one of the lamps. All this can be done from the outside of lens alignment and blocking device 10 without opening door 34. In this manner, a new lamp 166 can be substituted for a burned out lamp 44 in a matter of minutes without the aid of a skilled technician.

Figure 17A:
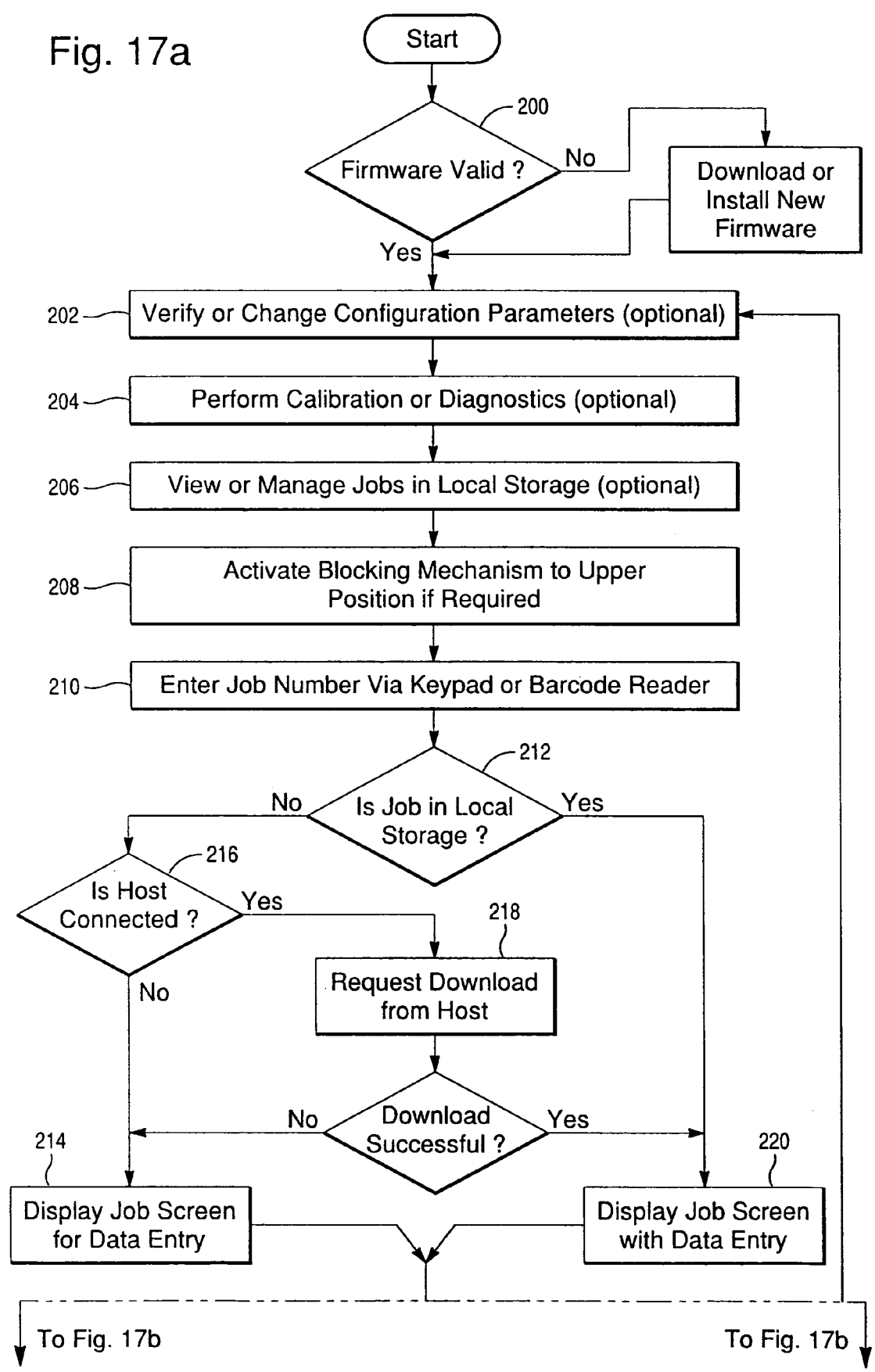
FIGS. 17a–b are a flow chart showing the operation of the alignment device of the foregoing figures.
Figure 17B:
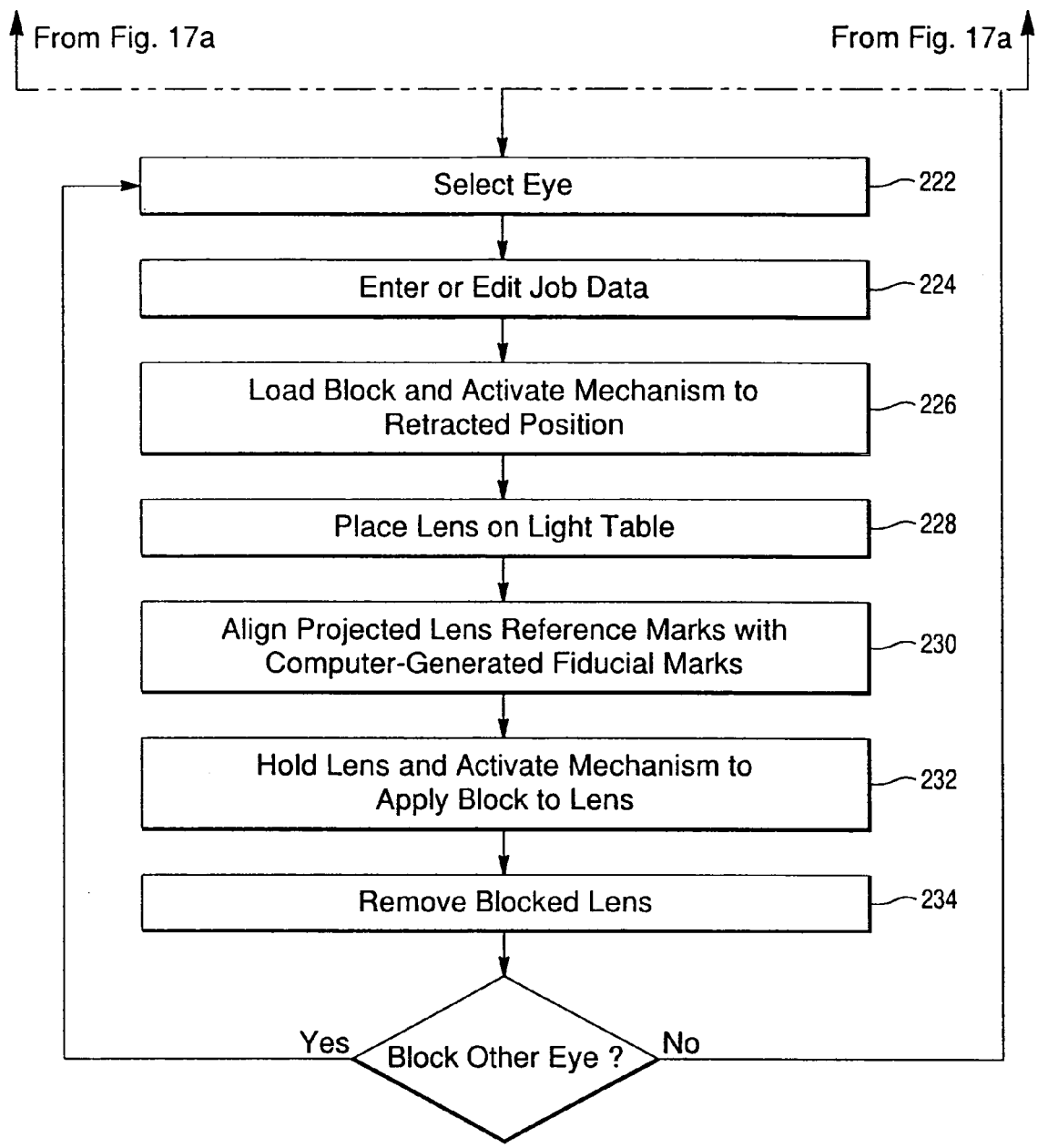

The use of lens alignment and blocking device 10 will now be described with reference to the flow chart of FIGS. 17a and 17b. When lens alignment and blocking device 10 is turned on, a self-test is conducted at step 200 to determine whether firmware in the device is valid. If the firmware is valid, the operator may optionally change configuration parameters at step 202, perform calibrations or diagnostics at step 204, or view or manage blocking jobs in local storage at step 206. Each of the stored jobs includes numerical data concerning a lens to be blocked and data for generating alignment images 86 for the particular lens, as best shown in FIG. 10. At step 208, the carriage 100 is shifted into blocking position 154, shown in FIG. 3, with the upper end 146 of chuck 144 extending though central opening 38 in stage 36 so that a block 148 can be attached to the chuck 144 on L-shaped platform 124. Next, at step 210, a job number is entered, either using keyboard 83 or a barcode reader (not shown), and at step 212, memory 85 is queried to determine whether a job associated with that job number is stored in memory. If the job is in local storage, processor 82 causes relevant data 84 for that job to be displayed on screen 32 in position 72 in step 214 in appropriately designated fields. If the job is not in local storage, it is determined at step 216 whether a host device (not shown) is connected to lens alignment and blocking device 10. If a host device is connected, a download of information is requested from the host at step 218. If the download is successful, data are displayed on screen 32. If the download is unsuccessful, or if there is no host device connected to the lens alignment and blocking device, then a job screen is displayed for data entry at step 220 and relevant data is manually entered via keyboard 83.

The job data will often include data relating to the prescription of a patient's left eye and a patient's right eye, and at step 222, a selection of either right eye or left eye is made (since only one lens blank can be blocked at a time), and at step 224 the job data is either entered or, optionally, edited. At step 226, block 148 is attached to chuck 146, and motor 26, which is operably connected to processor 82, is actuated via a key switch, preferably a foot-operated switch (not shown), to shift carriage 100 from the blocking position 154 to the viewing position 152 shown in FIG. 2. A lens blank 42 is then manually placed on pegs 40 at step 228. An image 42' of lens blank 42 will be visible on screen 32 in position 72 as the image is reflected off second mirror 52, passed through the lens of C-shaped optics housing 30, reflected off third mirror 54 and onto the rear surface of second region 74 of screen 32. FIG. 10 shows the projected image 42' of lens blank 42 on screen 32. Images 40' of pegs 40 are also visible, as are images 43' of reference markings 43 on the lens blank. Alignment images 86 generated by screen 32 can be seen combined with the projected image of reference markings 43'. At step 230, the operator moves the lens blank 42 until the images 43' of the reference markings 43 are aligned with the alignment images 86 on the screen 32. As noted above, because the image 42' of the lens blank is projected on a plane (the translucent film 87 on the rear surface 79 of screen 32) that is preferably less than about 0.5 millimeters from the alignment markings, which exist in the plane of liquid crystal layer 78 in screen 32, parallax is substantially eliminated. The alignment of alignment images 86 with the images 43' of reference markings 43 will be accurate even if screen 32 is viewed from an angle. Once the images 43' of the reference markings 43 are aligned with the alignment images 86 on screen 32, the operator, at step 232 engages motor 26, again using a key switch or foot operated switch (not shown) to move carriage 100 from the viewing position 152 to the blocking position 154. Crank arm 156 lifts L-shaped platform 124 as described above until adhesive pad 150 engages lens blank 42, and, at step 234, the lens block 148 with lens blank 42 adhered thereto is removed from the chuck 144 on lens alignment and blocking device 10. The process is repeated if additional lenses are to be blocked.

The subject invention has been described herein in terms of a preferred embodiment, it being understood that numerous modifications and additions to this embodiment will become apparent to those skilled in the art after a reading of the foregoing description. It is intended that all such modifications and additions comprise a part of this invention to the extent that they come within the scope of the several claims appended hereto.

We claim:

1. An alignment device, comprising:

a light source;

a first mirror;

a stage disposed between said light source and said first mirror for supporting an object such that an image of an object supported on the stage is reflected by said first mirror;

a carriage shiftable between first and second positions with respect to said stage, said first mirror being mounted on said carriage;

a screen;

a processor for generating an image on said screen; and at least one second mirror arranged to receive the image reflected from said first mirror and project the image of an object on the stage against said screen;

whereby said generated image on said screen is visible with the image of the object on the stage projected against said screen.

2. The device of claim 1, further including at least one lens located between said first mirror and said at least one second mirror.

3. The device of claim 2, wherein said at least one lens inverts the image passing through said at least one lens.

4. The device of claim 2, including a third mirror interposed between said first mirror and said at least one lens for directing an image of an object from said first mirror toward said at least one lens.

5. The device of claim 4, wherein said first mirror, said third mirror, said at least one second mirror and said at least one lens are arranged to direct a non-inverted image of an object on said stage toward said screen.

6. The device of claim 1, wherein said light source comprises a first lamp and a second lamp mounted on a rotatable support frame within a housing.

7. The device of claim 6 including a power source and a selector for selectively moving said first or second lamps into electrical engagement with said power source.

8. The device of claim 7, wherein said selector comprises a shaft connected to said rotatable support frame.

9. The deviceof claim 1, wherein said carriage is biased toward said first position.

10. The device of claim 9, including an actuator for shifting said carriage between said first and second positions.

11. The device of claim 10, wherein said stage has an opening and a block is mounted on said carriage, said block being aligned with said opening when said carriage is in said first position.

12. The device of claim 11, wherein said block is movable between raised and lowered positions with respect to said carriage.

13. The device of a 12, wherein said block is moved between said raised and lowered positions by said actuator.

14. The device of claim 13, wherein said actuator comprises a motor and a crank arm connected to said motor for rotation therewith.

15. The device of claim 1, wherein said screen comprises a liquid crystal display including a layer of liquid crystal material supported in a first plane and a rear surface parallel to said first plane, wherein the image of an object on the stage is projected onto said rear surface.

16. The device of claim 15, wherein said screen is at least partially translucent.

17. The device of claim 15, wherein said rear surface is spaced less than about 0.5 mm from said first plane.

18. The device of claim 15, wherein said screen has a first portion with a backlight thereon.

19. The device of claim 15, wherein the image of an object on said stage is projected onto said screen at a second position not having a backlight.

20. The device of claim 1, wherein said processor includes a memory storing data including a plurality of alignment images.

21. The device of claim 20 wherein said memory stores a plurality of lens shapes.

22. A lens alignment device comprising:
a stage for supporting a lens blank;
an at least partially translucent screen having a first side and a second side;
an image generator for generating an image on said screen; and
a projector for projecting an image of the lens blank on said stage against the second side of said screen, wherein said projector includes a light source disposed on a first side of said stage and at least one mirror disposed on a second side of said stage;
a carriage shiftable between first and second positions with respect to said stage, said at least one mirror being mounted on said carriage;
whereby, when said screen is viewed from said first side, the generated image is combined with the lens blank projected image.

23. The device of claim 22, wherein said projector includes optics for inverting and magnifying the lens blank image projected by said projector.

24. The device of claim 22, wherein the image generator comprises a computer processor.

25. The device of claim 22, wherein said at least partially translucent screen comprises an LCD.

26. The device of claim 25, wherein said LCD includes a backlight.

27. The device of claim 25, wherein said LCD includes a first region and a second region and a backlight mounted over only said first region.

* * * * *